US008578015B2

(12) United States Patent
Billhartz

(10) Patent No.: US 8,578,015 B2
(45) Date of Patent: *Nov. 5, 2013

(54) TRACKING TRAFFIC IN A MOBILE AD HOC NETWORK

(75) Inventor: Tom Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 2408 days.

This patent is subject to a terminal disclaimer.

(21) Appl. No.: 10/134,948

(22) Filed: Apr. 29, 2002

(65) Prior Publication Data

US 2003/0204587 A1 Oct. 30, 2003

(51) Int. Cl.
*G06F 15/173* (2006.01)
(52) U.S. Cl.
USPC ............................. 709/224; 709/238; 370/254
(58) Field of Classification Search
USPC .................. 709/223–226, 238–245; 370/238, 370/254–256, 351
See application file for complete search history.

(56) References Cited

U.S. PATENT DOCUMENTS

| 5,031,093 | A | * | 7/1991 | Hasegawa | 709/241 |
|---|---|---|---|---|---|
| 5,233,604 | A | * | 8/1993 | Ahmadi et al. | 370/238 |
| 5,412,654 | A | * | 5/1995 | Perkins | 370/312 |
| 5,450,408 | A | * | 9/1995 | Phaal | 370/256 |
| 5,530,963 | A | | 6/1996 | Moore et al. | 395/200.15 |
| 5,987,011 | A | * | 11/1999 | Toh | 370/331 |
| 6,046,992 | A | | 4/2000 | Meier et al. | 370/338 |
| 6,130,881 | A | | 10/2000 | Stiller et al. | 370/238 |
| 6,301,244 | B1 | * | 10/2001 | Huang et al. | 370/351 |
| 6,304,556 | B1 | | 10/2001 | Haas | 370/254 |
| 6,304,913 | B1 | | 10/2001 | Rune | 709/241 |
| 6,385,174 | B1 | | 5/2002 | Li | 370/252 |
| 6,678,252 | B1 | * | 1/2004 | Cansever | 370/253 |
| 6,754,192 | B2 | * | 6/2004 | Kennedy | 370/331 |
| 6,954,435 | B2 | * | 10/2005 | Billhartz et al. | 370/252 |
| 7,007,102 | B2 | * | 2/2006 | Billhartz et al. | 709/238 |
| 7,061,895 | B1 | * | 6/2006 | Habetha | 370/338 |
| 7,068,600 | B2 | | 6/2006 | Cain | |

(Continued)

FOREIGN PATENT DOCUMENTS

| JP | 2001-13617 B | 5/2001 | |
|---|---|---|---|
| WO | WO98/56140 | 12/1998 | |
| WO | WO0213468 | 2/2002 | ............. H04L 12/56 |
| WO | WO0223833 | 3/2002 | ............. H04L 12/56 |

OTHER PUBLICATIONS

Perkins et al., Quality of Service for Ad Hoc On-Demand Distance Vector Routing, Mobile Ad Hoc Networking Group, Jul. 14, 2000.*

(Continued)

*Primary Examiner* — Yasin Barqadle
(74) *Attorney, Agent, or Firm* — Allen, Dyer, Doppelt, Milbrath & Gilchrist, P.A.

(57) ABSTRACT

A mobile ad hoc network includes a plurality of wireless mobile nodes and a plurality of wireless communication links connecting the plurality of nodes together. The method of tracking traffic includes each node monitoring traffic communicated between nodes in the network, each node generating traffic information based upon how much traffic is being communicated between various nodes in the network, and each node storing the traffic information in a traffic database. The traffic information may be based upon bandwidth and may include at least one of error rate, end-to-end delay, end-to-end delay variation, hop count, expected path durability, and priority. Each node may discover and select traffic routes based upon the stored traffic information.

21 Claims, 13 Drawing Sheets

(56) References Cited

U.S. PATENT DOCUMENTS

| | | | |
|---|---|---|---|
| 7,616,961 | B2 | 11/2009 | Billhartz |
| 2001/0010717 | A1* | 8/2001 | Goto et al. ............... 379/127.01 |
| 2001/0033556 | A1 | 10/2001 | Krishnamurthy et al. .... 370/329 |
| 2003/0005162 | A1* | 1/2003 | Habetha ........................ 709/249 |
| 2003/0067941 | A1* | 4/2003 | Fall .............................. 370/468 |
| 2003/0079003 | A1* | 4/2003 | Burr ............................. 709/221 |
| 2003/0139187 | A1* | 7/2003 | Zhang et al. .................. 455/445 |
| 2003/0202468 | A1* | 10/2003 | Cain et al. ..................... 370/229 |
| 2003/0202476 | A1* | 10/2003 | Billhartz et al. ............. 370/236 |
| 2003/0204616 | A1* | 10/2003 | Billhartz et al. ............. 709/235 |
| 2004/0203820 | A1* | 10/2004 | Billhartz .................... 455/452.1 |
| 2005/0128944 | A1* | 6/2005 | Zhang et al. .................. 370/229 |
| 2005/0129000 | A1* | 6/2005 | Sivakumar et al. ........... 370/351 |

OTHER PUBLICATIONS

Quality of Service for Ad hoc On-Demand Distance Vector Routing, Charles E. Perkins, Elizabeth M. Royer, and Samir R. Das., Jul. 2000.*

An outsider's view of Manet, F. Baker, Mar. 17, 2002.*

Chakrabarti et al., "*QoS Issues in Ad Hoc Wireless Networks*", , IEEE Communications Magazine, (Feb. 2001), pp. 142-148.

Chen, "*Routing Support for Providing Guaranteed End-to-End Quality-of-Service,*" Ph.D. thesis, Univ. of Illinois at Urbana-Champaign, http://cairo.cs.uiuc.edu/papers/Scthesis.ps. 1999.

Mirhakkak et al., *Dynamic Quality-of-Service for Mobile Ad Hoc Networks*, MITRE Corp., 2000.

Van Dyck et al., *Distributed Sensor Processing Over an Ad-Hoc Wireless Network: Simulation Framework and Performance Criteria*, Proceedings IEEE Milcom, Oct. 2001.

Zhu, *Medium Access Control and Quality-of-Service for Mobile Ad Hoc Networks*, PHD Thesis, Department of Computer Engineering, University of Maryland, College Park, MD, 2001.

Royer et al., *A Review of Current Routing Protocols for Ad Hoc Mobile Wireless Networks*, IEEE Personal Communications, Apr. 1999, pp. 46-55.

Corson et al., *A Reservation-Based Multicast (RBM) Routing Protocol for Mobile Networks: Initial Route Constructions Phase*, ACM/I.1, No. 4, 1995, pp. 1-39.

Xiao et al., A Flexible Quality of Service Model for Mobile Ad Hoc Networks, *IEEE VTC2000-spring*, Tokyo, Japan, May 2000.

Wu et al., *QoS Support in Mobile Ad Hoc Networks*, Computing Science Department, University of Alberta, (no date available).

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On-Demand Distance Vector Routing*, Internet Engineering Task Force (IETF) MANET Working Group, Internet Draft, Jul. 2000.

Park et al., *Temporally-Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On-Demand Distance Vector (ADOV) Routing*, Internet Engineering Task Force (IETF) MANET Working Group, Internet Draft, Nov. 9, 2001.

"Hierarchically-organized, Multihop Mobile Wireless Networks for Quality-of-service Support", Ramanathan et al., Mobile Networks and Applications, vol. 3, No. 1, Jun. 1998, pp. 101-119, XP002403389, Hingham, Ma, USA, ISSN: 1383-469X; www.springerlink.com/content/wm34857003380343/fulltext.pdf.

"Quality of Service Support in Mobile ad-hoc IP Networks", Cansever et al., Military Communications Conference Proceedings, 1999. Milcom 1999, IEEE Atlantic City, NJ, USA Oct. 31, 1999-Nov. 3, 1999, Piscataway, NJ, USA, IEEE, US, vol. 1, pp. 30-34, XP010369531, ISBN: 0-7803-5538-5.

"A Novel Framework for QoS-aware Resource Discovery in Mobile Ad hoc Networks", Liu et al., ICC 2002. 2002 IEEE International Conference on Communications. Conference Proceedings. New York, Apr. 28, 2002-May 2, 2002, vol. 1 of 5, pp. 1011-1016, XP010589645, ISBN: 0-7803-7400-2.

"INSIGNIA: An IP-based Quality of Service Framework for Mobile Ad Hoc Networks", Lee et al., Journal of Parallel and Distributed Computing, Elsevier, Amsterdam, NL, vol. 60, No. 4, Apr. 2000, pp. 374-406, XP004408321, ISSN: 0743-7315.

"A Flexible Quality of Service Model for Mobile Ad-Hoc Networks", Xiao et al., VTC 2000—Spring, 2000 IEEE 51$^{st}$ Vehicular Technology Conference Proceedings. Tokyo, Japan, May 15-18, 2000, IEEE Vehicular Technology Conference, New York, USA, vol. 1 of 3. Conf 51, May 15, 2000, pp. 445-449, XP000970658, ISBN: 07803-5719-1.

Billhartz et al., U.S. Appl. No. 10/134,715, filed Apr. 29, 2002, cited May 20, 2005 Notice of Allowance is stored in the USPTO's IFW system.

Billhartz et al., U.S. Appl. No. 10/134,173, filed Apr. 29, 2002, cited Nov. 16, 2005 Notice of Allowance is stored in the USPTO's IFW system.

Cain, U.S. Appl. No. 10/134,714, filed Apr. 29, 2002, cited Feb. 2, 2006 Notice of Allowance is stored in the USPTO's IFW system.

Billhartz, U.S. Appl. No. 10/134,862, filed Apr. 29, 2009, cited Sep. 10, 2009 Notice of Allowance is stored in the USPTO's IFW system.

* cited by examiner

TRACKING TRAFFIC IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes sharing a common radio channel. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit with each other. The network does not depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide limited but much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes are essentially the same and there is no natural hierarchy or central controller in the network. All functions have to be distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood and not far away from itself).

A routing protocol needs to adapt to frequent topology changes and with less accurate information. Because of these unique requirements, routing in these networks are very different from others. Gathering fresh information about the entire network is often costly and impractical. Many routing protocols are reactive (on-demand) protocols: they collect routing information only when necessary and to destinations they need routes to, and do not maintain unused routes. This way the routing overhead is greatly reduced compared to pro-active protocols which maintain optimal routes to all destinations at all time. This is important for a protocol to be adaptive. Ad Hoc on Demand Distance Vector (AODV), Dynamic Source Routing (DSR) and Temporally Ordered Routing Algorithm (TORA) are representatives of on-demand routing protocols presented at the MANET working group.

Examples of other various routing protocols include Destination Sequenced Distance-Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both pro-active and reactive approaches.

These conventional routing protocols use a best effort approach in selecting a route from the source node to the destination node. Typically, the number of hops is the main criteria in such a best effort approach. In other words, the route with the least amount of hops is selected as the transmission route.

Quality-of-service (QoS) routing in mobile ad hoc networks is gaining interest. To provide quality-of-service, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

Some examples of QoS routing approaches are set forth by Chenxi Zhu in the publication entitled "Medium Access Control and Quality-of-Service Routing for Mobile Ad Hoc Networks," 2001, and by M. Mirhakkak et al. in the publication entitled "Dynamic Quality-of-Service for Mobile Ad Hoc Networks," MITRE Corp., 2000. Zhu discusses establishing bandwidth guaranteed QoS routes in small networks whose topologies change at a low to medium rate. Mirhakkak et al. are concerned with resource reservation requests which specify a range of QoS values while the network makes a commitment to provide service within this range.

At each node, admission control is performed to forward traffic from other nodes. Typically, conventional admission control protocols provide for full disclosure regarding routes and connectivity. In other words, each node shares all route and connectivity data with other nodes so that the best-effort routes are selected overall.

SUMMARY OF THE INVENTION

In view of the foregoing background, it is therefore an object of the present invention to provide traffic tracking for multihop routes in a mobile ad hoc network.

This and other objects, features, and advantages in accordance with the present invention are provided by a method for tracking traffic in a mobile ad hoc network. The network includes a plurality of wireless mobile nodes and a plurality of wireless communication links connecting the plurality of nodes together. The method includes each node monitoring traffic communicated between nodes in the network, each node generating traffic information based upon how much traffic is being communicated between various nodes in the network, and each node storing the traffic information in a traffic database or table.

In the method, the traffic information may be based upon bandwidth and may include at least one of error rate, end-toend delay, end-to-end delay variation, hop count, expected path durability, and priority. The traffic database may comprise a 1-hop traffic matrix. Monitoring may include broadcasting a traffic activity query, and processing replies to the traffic activity query, or passively monitoring the traffic between nodes in the network. Each node may discover and select traffic routes based upon the stored traffic information.

Furthermore, each node may generate traffic destination information based upon how many destinations each of various nodes communicates with in the network, and store the traffic destination information in a destination quantity database or table. Thus, each node may also discover and select traffic routes based upon the stored traffic destination information.

A system aspect of the present invention is directed to a mobile ad hoc network having a plurality of mobile nodes, and a plurality of wireless communication links connecting the plurality of mobile nodes together. Each mobile node comprises a communications device to wirelessly and unidirectionally or bi-directionally communicate with other nodes of the plurality of nodes via the wireless communication links, and a controller to route communications via the communications device. The controller includes a traffic monitoring unit to monitor traffic communicated between nodes in the network, a traffic information generator to generate traffic information based upon how much traffic is being communicated between various nodes in the network, and a traffic information buffer to store the traffic information in a traffic database.

DETAILED DESCRIPTION OF THE PREFERRED EMBODIMENTS

Figure 1:
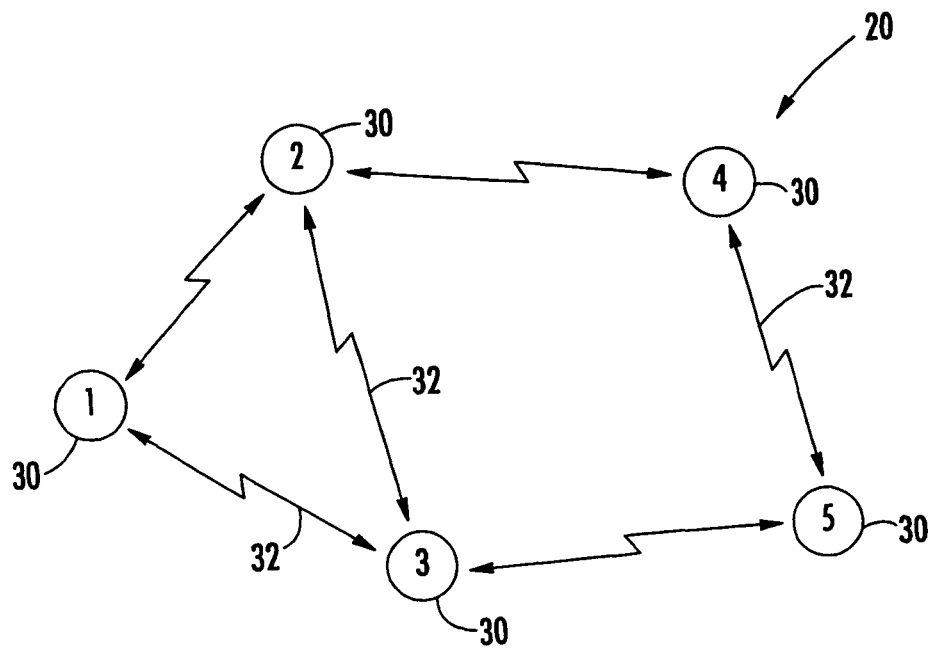
FIGS. 1-4 are schematic diagrams of a mobile ad hoc network including QoS routing in accordance with the present invention.
Figure 2:
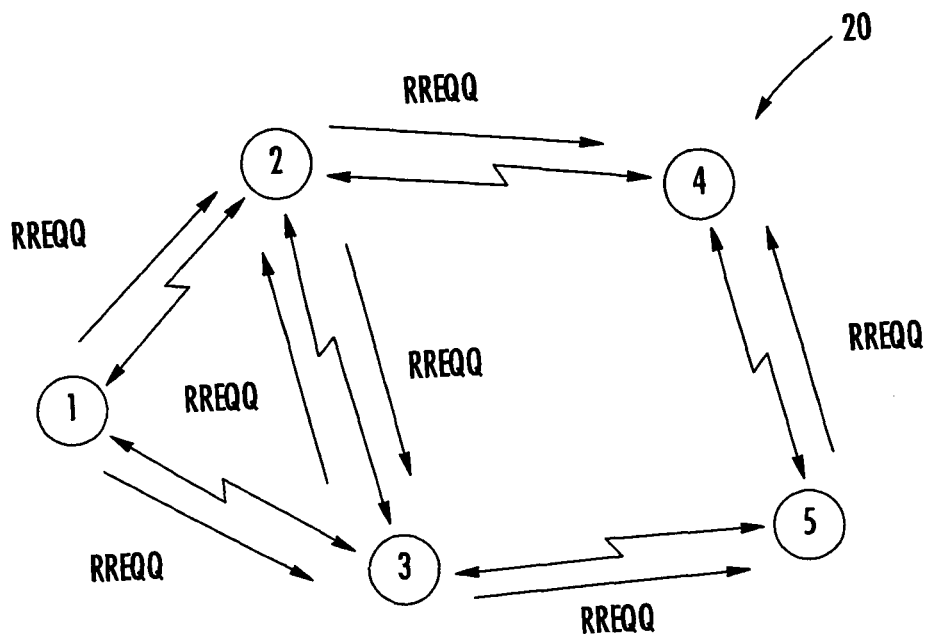
Figure 3:
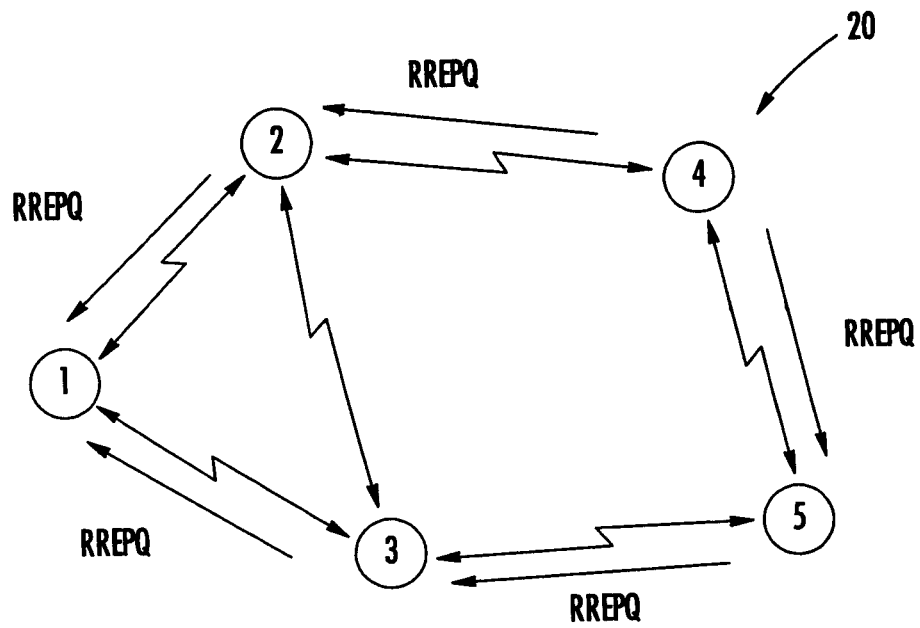
Figure 4:
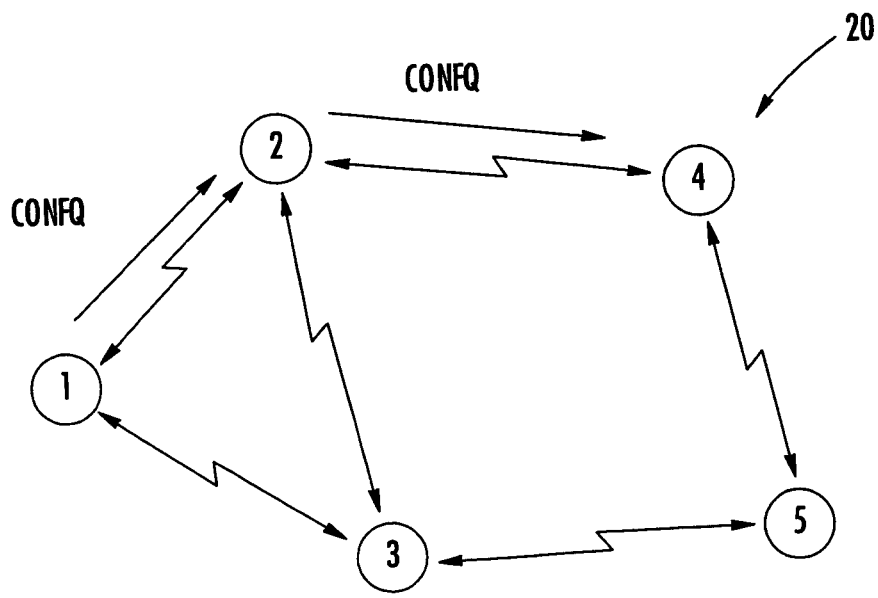
Figure 5:
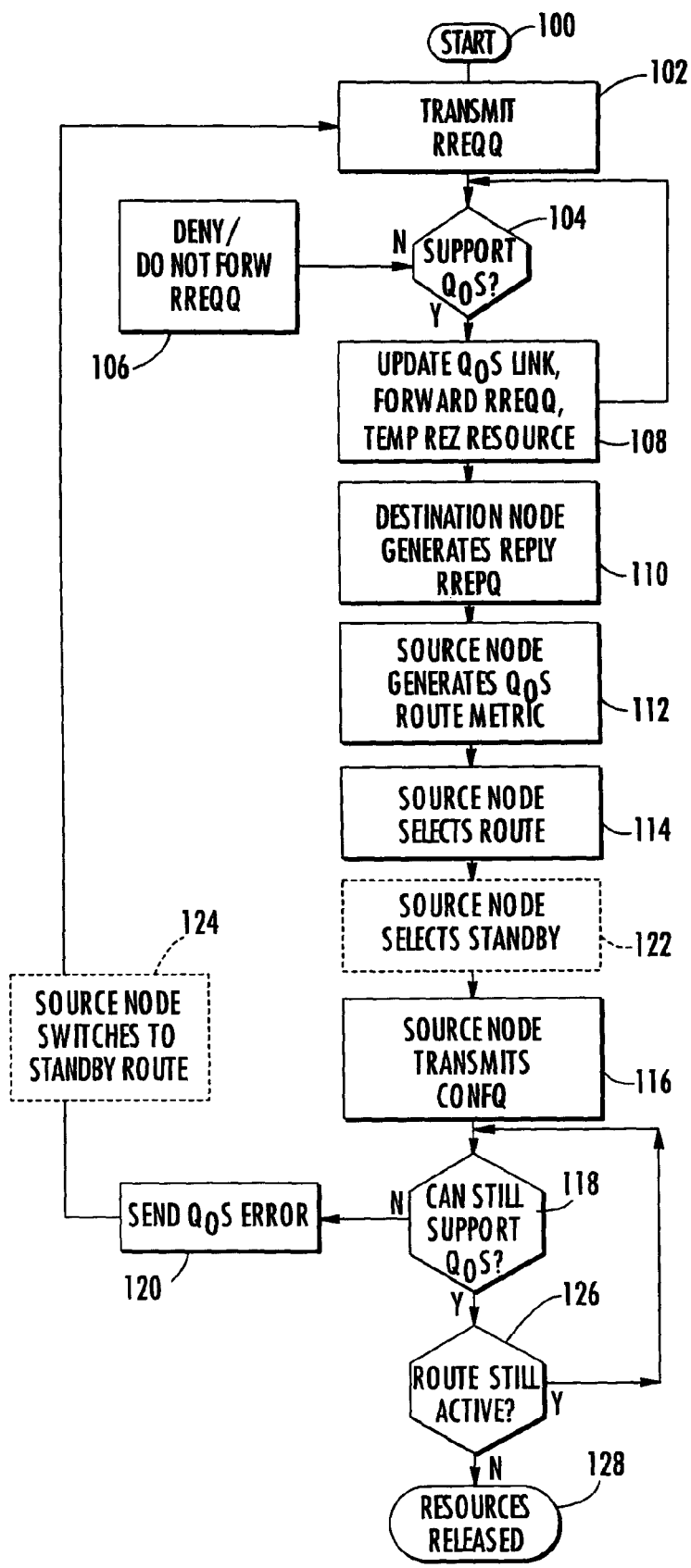
FIG. 5 is a flowchart illustrating the method steps for QoS routing in a mobile ad hoc network in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1-5, a method for determining a route from a source node to a destination node in a mobile ad hoc network 20 will now be described. The network 20 includes a plurality of mobile nodes 30 including the source node 1 and the destination node 4 with intermediate nodes 2, 3 and 5 therebetween. The nodes 30, such as laptop computers, personal digital assistants (PDAs) or mobile phones, are connected by wireless communication links 32 as would be appreciated by the skilled artisan. The method begins (block 100) and includes transmitting a quality-of-service (QoS) route request RREQQ from the source node 1 to discover routing to the destination node 4 based upon a QoS parameter, as indicated at block 102 in FIG. 5. The QoS parameter is preferably based upon available bandwidth, error rate, end-to-end delay, end-to-end delay variation, hop count, expected path durability, and/or priority as will be discussed in further detail below. The route request RREQQ includes a QOS flow identifier and an updatable QoS link metric.

Furthermore, at block 104, the method includes each intermediate node 2, 3 and 5 determining whether the node can support the requested QoS parameter of the QoS route request RREQQ. If the node cannot support the QoS parameter of a particular request RREQQ, then the request is denied or simply not forwarded by the node (block 106). If the node, for example node 3, can support the QoS parameter of a particular request RREQQ, then the node updates the QoS link metric, forwards the QoS route request to other intermediate nodes 2 and 5, and temporarily reserves node resources for that QoS route request (block 108). Intermediate nodes 2 and 5 also must determine whether they can support the requested QoS parameter of the QoS route request RREQQ forwarded from node 3. If so, the route request RREQQ with the updated QoS link metric is then forwarded to the destination node 4.

The destination node 4, upon receiving the QoS route request RREQQ, generates a reply RREPQ to the source node 1 including the flow identifier and updated QoS link metric for each discovered route (block 110). In other words, the destination node 4 may have received the forwarded route request RREQQ from any of various possible routes including, for example, 1-2-4 or 1-3-5-4. A reply RREPQ is generated in each case. At block 112, the source node 1 generates QoS route metrics based upon updated QoS link metrics in replies RREPQ from the destination node 4 for discovered routes. Also, at block 114, the source node 1 then selects a route to the destination node 4 based upon the QoS route metrics, and, at block 116, the source node transmits route confirmations CONFQ to intermediate nodes on the selected route. This is to confirm the use of the resources on the selected route that were temporarily reserved at block 108. Other temporarily reserved resources on discovered but non-selected routes may be permitted to time out by not transmitting CONFQ on those routes.

Also, the source node 1 may select at least one standby route either with or without sending confirmations CONFQ to the intermediate nodes on the standby route (block 122). Such a standby route may be for duplicate transmissions, for additional reliability, or may be used as a backup route in case of route and/or QoS failure. At block 118, the intermediate nodes 2, 3 and 5, and/or the destination node 4, may detect at any time whether the node can continue to support the requested QoS parameter of the QoS route request RREQQ. If the node can continue to support the request RREQQ throughout propagation of the traffic, reserved resources and associated routes may be permitted to time out if determined inactive, at block 126, and be released, block 128, if not used for a period of time either by data traffic or by the sending of periodic CONFQ messages.

If the node cannot continue to support the request RREQQ, then the node generates a QoS error notification RERRQ to the source node 1 (block 120). Here, the source node 1 may maintain the selected route, upon receiving the QoS error notification RERRQ, while again transmitting a quality-of-service (QoS) route request RREQQ to discover a new routing path to the destination node 4 based upon the QoS parameter (block 102). The source node 1 may also switch to the standby route upon receiving the QoS error notification RERRQ (block 124).

The described method can be applied to any type of On-Demand or Reactive routing protocol, such as Dynamic Source Routing (DSR) or Ad-Hoc On-Demand Distance Vector (AODV) routing, or to any hybrid proactive/reactive protocol, such as Zone Routing Protocol (ZRP), as would be appreciated by the skilled artisan.

A more specific example considering minimum bandwidth allocation and a maximum delay constraint as categories of QoS will now be described. For a fixed bandwidth allocation it is assumed that a node 30 is able to reserve a certain amount of capacity or bandwidth. Again, source node 1 of a traffic flow will send the QoS Route Request RREQQ for each required flow (the last Q in the notation indicates a QoS request). The RREQQ message performs the function of discovering a route that can support the required QoS. Nodes that forward the RREQQ to the destination 4 will note if they can meet the requested QoS before passing on the RREQQ and they will temporarily reserve resources if needed. A Route Reply RREPQ packet is returned from the destination with an indication that the requested QoS can be met over that path. The source node 1 may then collect multiple potential paths to the destination 4 before deciding upon the best choice to provide the desired QoS. Once this path is determined, a Confirm CONFQ message is sent to the destination 4 along the indicated path. Along the way on this path any temporary resource reservations are confirmed to be permanent reservations. QoS reservations are timed out if not used for a specified period of time. If a link fails along the route or if the QoS requirement cannot be met, a Route Error (RERRQ) packet is generated and returned to the source node.

More specifically, when a new QoS route is needed to a given destination node 4, the source node 1 broadcasts a RREQQ packet to the destination node. This is a special type of packet similar to the conventional RREQ packet used in a protocol such as DSR or AODV. The conventional RREQ broadcast is used for "best effort" service. The method of the present invention may still follow the conventional procedures established by the protocol for best effort service.

If a specified minimum capacity or bandwidth is required for a traffic flow, the special RREQQ packet is used to reserve a flow at a specified capacity to the destination 4. In this case, a flow ID is assigned to the RREQQ by the source node 1 which combined with the source node address uniquely identifies the flow to any node in the network 20 that is forwarding the flow. The RREQQ packet also indicates the capacity that is to be reserved.

At each node 2, 3 and 5 in the path to the destination 4, the minimum capacity or bandwidth requirement is checked against available capacity to determine if a reservation can be made for the flow. If the node can accommodate the required traffic flow, then the capacity is temporarily reserved for that flow ID. This temporary reservation is released if a CONFQ message is not received within a short period of time. If the RREQQ is meant to insure that a path can be found that does not exceed a specified maximum delay, then each node along the path must be able to estimate its contribution to the total path delay and check to see if the total delay along the path so far plus its contribution exceeds the specified maximum delay bound.

Unlike conventional application of DSR and AODV for "best effort" traffic, the RREQQ must be allowed to propagate all the way to the destination node 4 to determine if a valid path exists that satisfies the QoS requirement. If such a path is found, then the destination node 4 generates a RREPQ message to be returned to the source node 1. This message indicates to the source node that a valid path has been found to the destination node 4 that satisfies the requested QoS and a route has been established (in the case of DSR a source route is returned). Estimated path delay is included in the RREPQ for a request seeking a delay guarantee as well as for a path guaranteeing capacity.

The source node 1 may receive multiple RREPQ for paths to the destination node 4 that can meet the required QoS. It will rank order these and send out a CONFQ message indicating its selection of a path on the highest ranked path. The other paths may be kept as backup paths, but if the CONFQ is not sent on these paths, there is no guarantee that the required resources will be available if needed as a backup alternate path.

If at any intermediate node 2, 3 and 5 or the destination node 4, the requested QoS is violated and cannot be satisfied, then the RREQQ packet is discarded knowing that the path through this node cannot satisfy the requested QoS. However, other paths may be found by the discovery process. If at any time a link fails along the route or if the QoS requirement cannot be met, a Route Error RERRQ packet is generated and returned to the source node 1 for each traffic flow affected by the failure. In this case either a backup path must be used or the route discovery process is initiated again.

The described procedures are easily applied to the DSR protocol. The conventional DSR message types RREQ, RREP, RRER are defined as optional packet types, and can be used as defined for the conventional operation of the protocol to support "best effort" traffic in a backwards compatibility mode. New optional packet types are defined to support QoS including the RREQQ, RREPQ, RRERQ, and CONFQ packet types to be used for managing QoS paths. Definition of the required header fields for these types is straightforward based on the functions defined above. A special type of QoS source routed packet for QoS mission data would also be included. This packet would include the flow ID to identify which flow the packet belonged and to allow for metering of flow traffic.

The following procedures would be used if a failure causes a node to issue a RERRQ packet. If a RERRQ packet is received at the source node, then the current route is discarded and a backup route is tried. The first packet sent on the backup route will be another type of special QoS source routed packet, the RREQT, that includes the flow ID and the QoS parameters. This packet could also include mission data. Each node along the path will have to check to see if they are still maintaining a temporary reservation for the flow. If not they will recheck to see if they can support the flow and make a temporary reservation. If the packet reaches the destination with the flow supported at each intermediate node, then the destination node will return a RREPQ packet notifying the source that the path is valid.

If any node cannot support the flow, then the packet is discarded and the node returns a RERRQ packet to the source node notifying it that the path cannot support the requested QoS parameters. If the source node receives a RREPQ packet, then it sends a CONFQ message along the selected path confirming the choice of path in addition to continuing to send the mission data for that traffic flow.

If the source node receives a RERRQ packet, then it tries the same procedure on the next available backup path. If the source node has no more backup source routes to the destination, the source node begins another route discovery process for a new QoS path to the destination node. Mission data flow is interrupted until a new route is found. For any specific protocol, the data structures required to manage the resources allocated to each traffic flow can be defined, and how to identify the flows and how to look up the routes assigned to each flow can also be defined.

Figure 6:
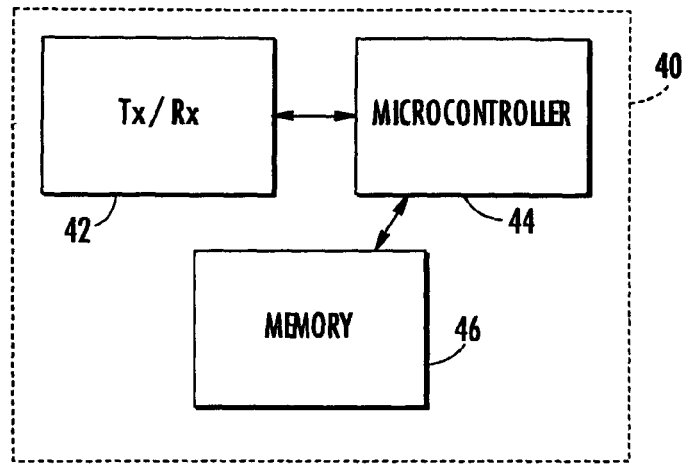
FIG. 6 is a schematic diagram illustrating a router of a node in accordance with the network of the present invention.
Figure 7:
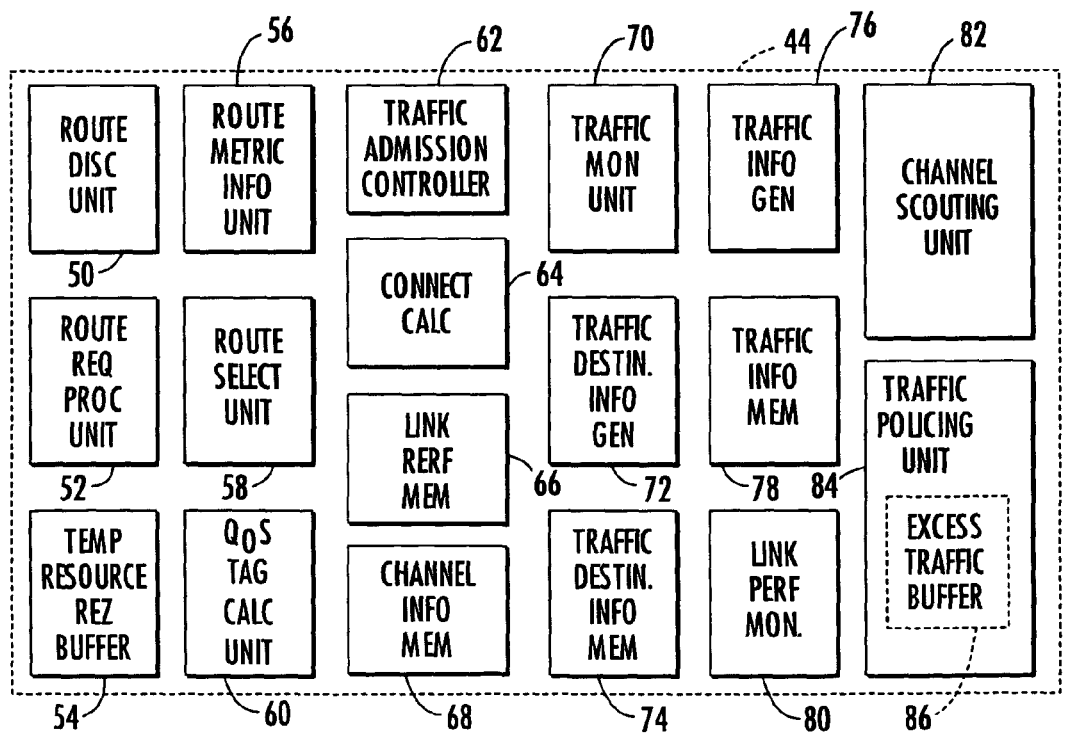
FIG. 7 is a schematic diagram illustrating the details of the controller of the router in FIG. 6.
Figure 8:
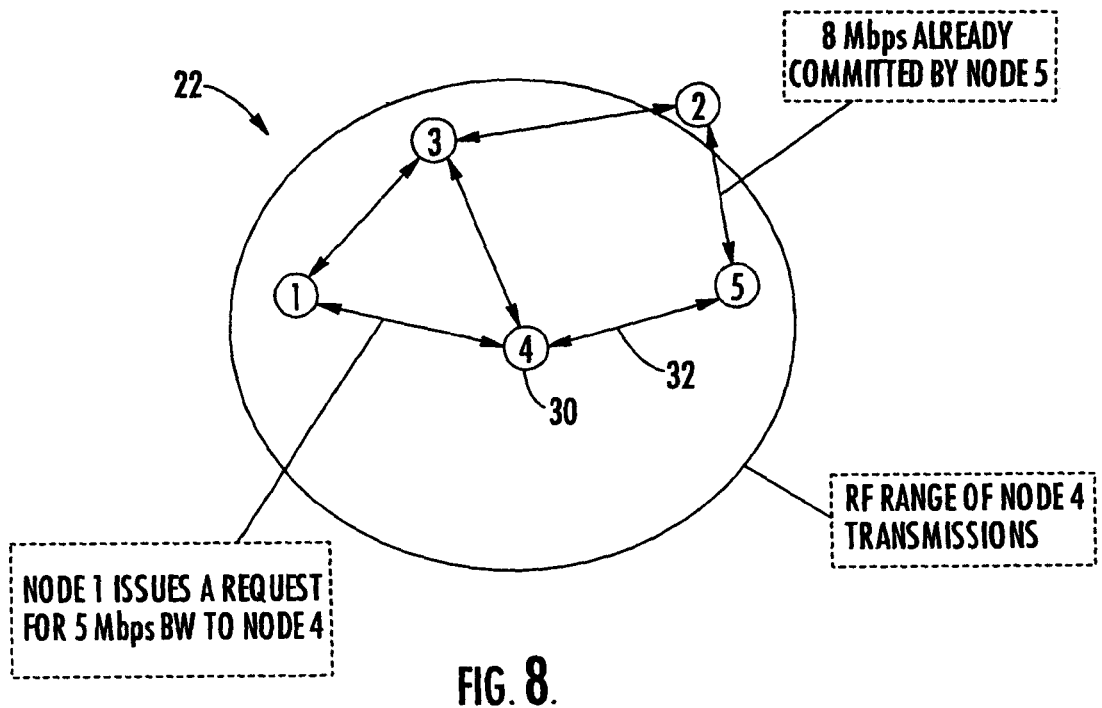
FIGS. 8-10 are schematic diagrams of a mobile ad hoc network including admission control in accordance with the present invention.
Figure 9:
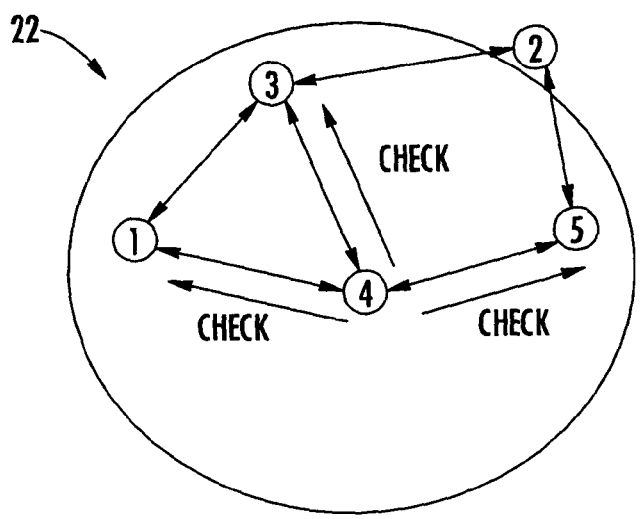
Figure 10:
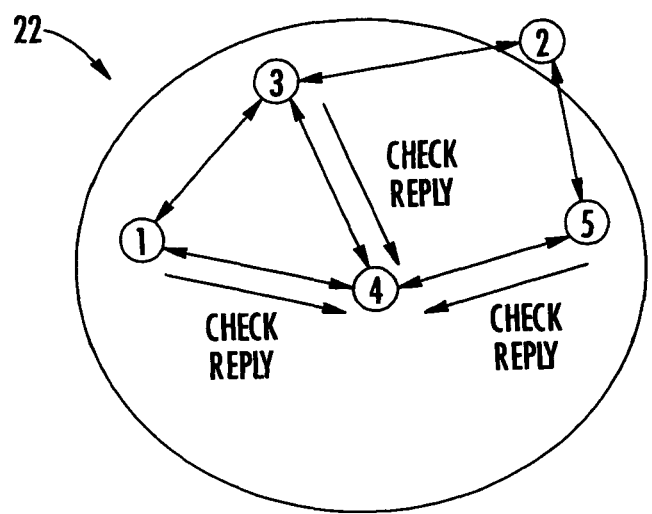
Figure 11:
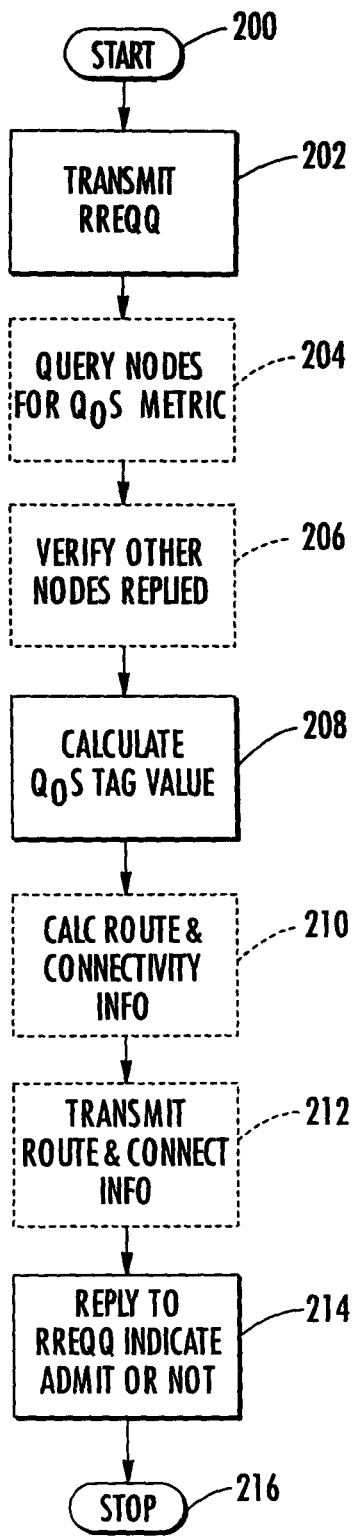
FIG. 11 is a flowchart illustrating the method steps for admission control in a mobile ad hoc network in accordance with the present invention.

Referring now additionally to FIGS. 6 and 7, a system aspect of the invention will be described. A mobile ad hoc network 20 includes a plurality of mobile nodes 30, and a plurality of wireless communication links 32 connecting the plurality of mobile nodes together. Each mobile node includes a router 40 (FIG. 6) that has a communications device 42 to wirelessly and uni-directionally or bi-directionally communicate with other nodes via the wireless communication links 32, and a controller 44 to route communications via the communications device 42. Also, a memory 46 may be included as part of the controller 44 or in connection with the controller.

As shown in FIG. 7, the controller 44 includes a route discovery unit 50 to transmit the quality-of-service (QoS) route requests to other nodes to discover routing to a destination node based upon at least one QoS parameter. Again, the route request includes a flow identifier and a QoS link metric. Also, a route request processing unit 52 determines whether the node can support a requested QoS parameter of a QoS route request and to update the QoS link metric, and a temporary resource reservation table 54 contains temporary node resource reservations for QoS route requests having supportable QoS parameters. Furthermore, a route metric formation unit 56 generates QoS route metrics based upon updated QoS link metrics in replies from nodes with node resource reservations, and a route selection unit 58 selects a route to the destination node based upon the QoS route metrics and to transmit route confirmations to nodes on a selected route.

The route selection unit 58 may select a standby route, such as for backup or duplicate transmissions, with or without sending confirmations CONFQ to the nodes on the standby route. The route request processing unit 52 detects whether the node can continue to support the requested QoS parameter of the QoS route request and, if not, generates the QoS error notification RERRQ. The route selection unit 58 preferably maintains the selected route, upon receiving a QoS error notification from another node, while the route discovery unit 50 transmits another quality-of-service (QoS) route request RREQQ to discover new routing to the destination node based upon the QoS parameter. The route selection unit 58 may switch to the standby route upon receiving the QoS error notification RERRQ from another node.

Another embodiment of the present invention provides traffic admission control for multihop routes in the mobile ad hoc network 22 while maintaining the quality of service needed, and will be described with reference to FIGS. 8-11. Such an admission control method will adaptively allow a node to keep some resources for its own traffic, while sharing fairly in the forwarding of other's traffic. Again, the ad-hoc network is made up of a plurality of wireless mobile nodes 30 and a plurality of wireless communication links 32 connecting the plurality of nodes together.

The method for controlling traffic admission in the mobile ad hoc network 22 begins (block 200) and includes a source node transmitting quality-of-service (QoS) route requests RREQQ to discover traffic routing based upon a QoS parameter (block 202). At block 208, each node 30 in the network 22 calculates a node QoS tag value to make traffic admission control decisions. The node QoS tag value is a function of at least one node specific QoS metric. The QoS parameter may be based upon, for example, bandwidth, error rate, end-to-end delay, end-to-end delay variation, hop count, expected path durability, and/or priority, while the node specific QoS metric may include one or more of available power, available bandwidth by the node, recent error rate, recent delay, available bandwidth by other nodes within a range, and node queue size, for example. The QoS tag value may be a weighted sum of each term, or a vector with each term as an element.

Each node 30 determines admission based upon the calculated QoS tag value and the QoS parameter of QoS route requests RREQQ, and may reply to the source node, regarding whether traffic will be admitted in response to the QoS route requests (block 214). Furthermore, each node 30 may calculate route and connectivity information associated with the node (block 210), and transmit the route and connectivity information and the QoS tag value to other nodes for traffic route selection (block 212).

Calculating the node QoS tag value 208 may include querying other nodes within a range for information regarding at least one QoS metric (block 204), and processing the QoS metric information received from the other nodes and the at least one node specific QoS metric to calculate the node QoS tag value. Calculating the node QoS tag value may further comprise verifying that each other node within the range has replied with QoS metric information (block 206).

More specifically, most of the QoS metric terms such as available power, available bandwidth by the node, recent error rate, recent delay, and node queue size, are known locally to the node. However, available bandwidth by other nodes within a range, for example, is not known locally. Thus, referring to FIG. 8, if node 1 issues a request to node 4 for 5 Mbps of an 11 Mbps transmission medium, node 4 must check to see if any other nodes in range (here nodes 1, 3 and 5) have already made prohibitive commitments. So, node 4 broadcasts a CHECK message and any nodes within range that have committed bandwidth will send a CHECK REPLY back indicating such. Node 4 makes sure that it has heard a CHECK REPLY from all nodes that it has heard from lately. With the received information, node 4 can now make a decision on whether it can support the QoS parameter of the route request RREQQ.

Replying to QoS route requests (block 214) may comprise indicating what traffic routing the node can support based upon the node QoS tag value, when the node cannot support the QoS parameter of the route request. For example, if node 4 cannot commit to the request, it may issue a reply that describes the most that it can support. Accordingly, the source can decide whether the level is good enough or whether to scale back the request and issue a relaxed QoS request RREQQ.

As discussed, conventional approaches provide full disclosure regarding routes and connectivity. In other words, each node 30 shares all that it knows with others, so that "best" (usually fewest hops) routes are selected overall. In this invention, this route and connectivity information is tagged with a value that allows other nodes to use it based on the Quality of Service needed. Additionally, the node sharing the information can decide on the level of QoS that will be allowed to use that information. This decision can be based on a common set of rules, or per node since some nodes will be advantaged. For example, a node that finds itself forwarding many packets, whose battery is running out, and is having trouble finding bandwidth for its own traffic may advertise his routes and connectivity to certain other nodes with a tag that disallows all but the most important (high priority) packets.

A system aspect of this embodiment of the present invention is directed to the mobile ad hoc network 22 including the plurality of mobile nodes 30, and the plurality of wireless communication links 32 connecting the plurality of mobile nodes together. As described earlier with reference to FIGS. 6 and 7, each mobile node has a router 40 that includes the communications device 42 to wirelessly and unidirectionally or bi-directionally communicate with other via the wireless communication links, and a controller 44 to route communications via the communications device. The controller 44 includes a route discovery unit 50 to transmit quality-of-service (QoS) route requests to other nodes to discover routing to a destination node based upon at least one QoS parameter. Here, a QoS tag calculation unit 60 calculates the node QoS tag value to make traffic admission control decisions. A traffic admission controller 62 determines whether to admit traffic in response to QoS route requests based upon the calculated QoS tag value and the QoS parameter of QoS route requests.

The controller 44 may also include a connectivity calculator 64 to calculate route and connectivity information associated with the node, which may be transmitted to other nodes for traffic route selection. The QoS tag calculation unit 60 may query other nodes within a range for information regarding at least one QoS metric, and process the QoS metric information received from the other nodes and the at least one node specific QoS metric to calculate the node QoS tag value. Also, the QoS tag calculation unit 60 may verify that each other node within the range has replied with QoS metric information.

Furthermore, the route request processing unit 52 replies to QoS route requests to indicate whether the node can support the QoS parameter of the route request and admit the traffic. Also, the route request processing unit 52 may indicate what traffic routing the node can support based upon the node QoS tag value, when the node cannot support the QoS parameter of the route request.

Figure 12:
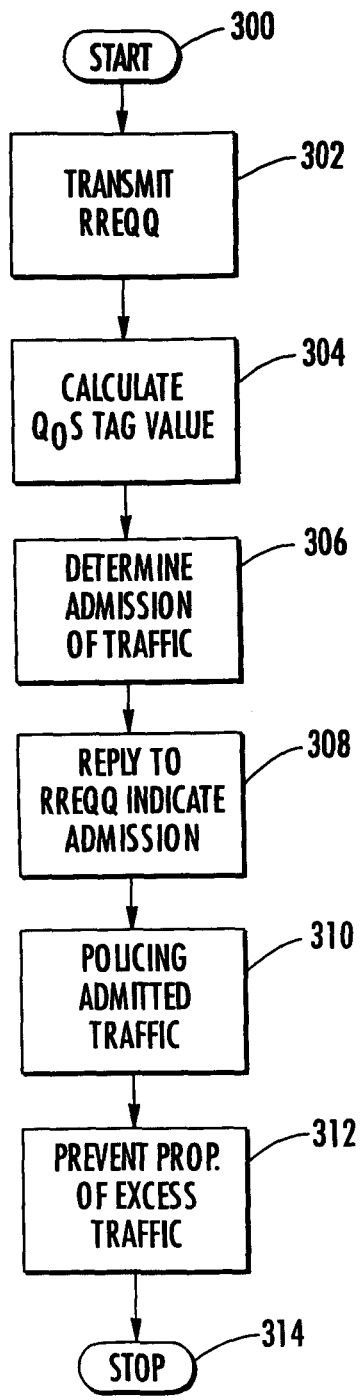
FIG. 12 is a flowchart illustrating the method steps for policing traffic admission control in a mobile ad hoc network in accordance with the present invention.

Another embodiment of the present invention provides traffic policing for multihop routes in a mobile ad hoc network 22, and will be described with reference to FIG. 12. as previously described, the network 22 includes the plurality of wireless mobile nodes 30 and the plurality of wireless communication links 32 connecting the plurality of nodes together. The method begins at block 300 and includes nodes transmitting quality-of-service (QoS) route requests RREQQ to discover traffic routing based upon a QoS parameter (block 302) as described in the other embodiments. Here, the QoS route requests RREQQ include at least the traffic flow identifier. At block 304, each node calculates a node QoS tag value to make traffic admission control decisions, and each node determines whether to admit traffic in response to QoS route requests based upon the calculated QoS tag value and the QoS parameter of QoS route requests (block 306). Also, at block 308, each node replies to QoS route requests to indicate whether the node can support the QoS parameter of the route request and admit the traffic. However, in this embodiment, each node polices admitted traffic based upon the traffic flow identifier to ensure that admitted traffic does not exceed the QoS parameter of the QoS route request RREQQ (block 310).

Again, the QoS parameter may be based upon available bandwidth, error rate, end-to-end delay, end-to-end delay variation, hop count, expected path durability, and/or priority, for example, while the node specific QoS tag value may be a function of at least one of available power, available bandwidth by the node, recent error rate, recent delay, available bandwidth by other nodes within a range, and node queue size, for example. In other words, if a request RREQQ includes a requirement for certain amount of bandwidth, for example, and the node admits the traffic associated with the request, then the node polices itself to ensure that the admitted traffic does not exceed the requested bandwidth.

The method preferably includes each node preventing propagation of traffic that exceeds the QoS parameter of the QoS route request (block 312). This step may include buffering traffic that exceeds the QoS parameter of the QoS route request, and propagating buffered traffic at the QoS parameter of the QoS route request. Alternatively, each node may propagate buffered traffic when required resources become available, or simply discard traffic that exceeds the QoS parameter of the QoS route request. Furthermore, as described in the other embodiments, replying to QoS route requests may comprise indicating what traffic routing the node can support based upon the node QoS tag value, when the node cannot support the QoS parameter of the route request.

Referring again to FIG. 7, the controller 44 includes a traffic policing unit 84 to police the admitted traffic based upon the traffic flow identifier to ensure that admitted traffic does not exceed the QoS parameter of the QoS route request. Also, the traffic policing unit 84 preferably includes an excess traffic buffer 86 for storing the excess traffic.

More specifically, the traffic flow ID is used in route tables and in the QoS packets (both control and data). As discussed, this provides an identifier for performing admission control. The source node that has obtained a reservation for a path of a certain capacity, for example, to the destination node can use the flow ID and meter the traffic to perform policing of the traffic. This guarantees that it never admits more than agreed upon capacity for that flow ID. In addition, each node in the path to the destination can perform policing against the allocated capacity. Of course criteria other than the available capacity could be used as a criteria for deciding whether to support a given flow request. For example, a node running low on battery power may not want to support a given traffic flow. Then in this case, the RREQQ message can be ignored thereby disallowing use of the node as a forwarding node for the requested traffic flow.

Figure 13:
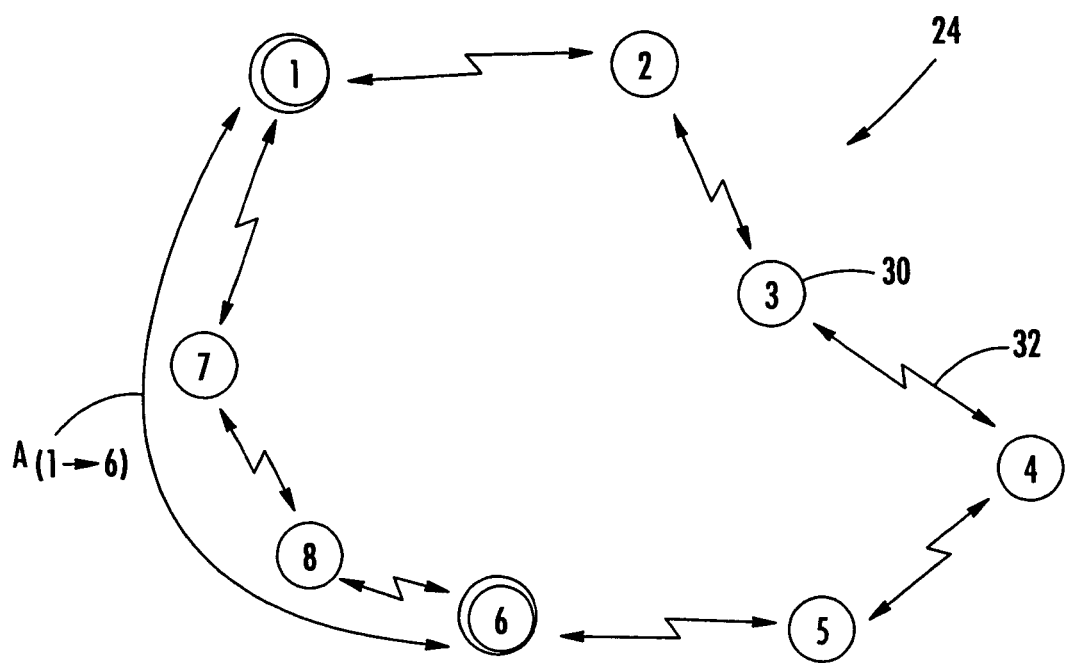
FIG. 13 is a schematic diagram of a mobile ad hoc network including traffic tracking in accordance with the present invention.
Figure 14:
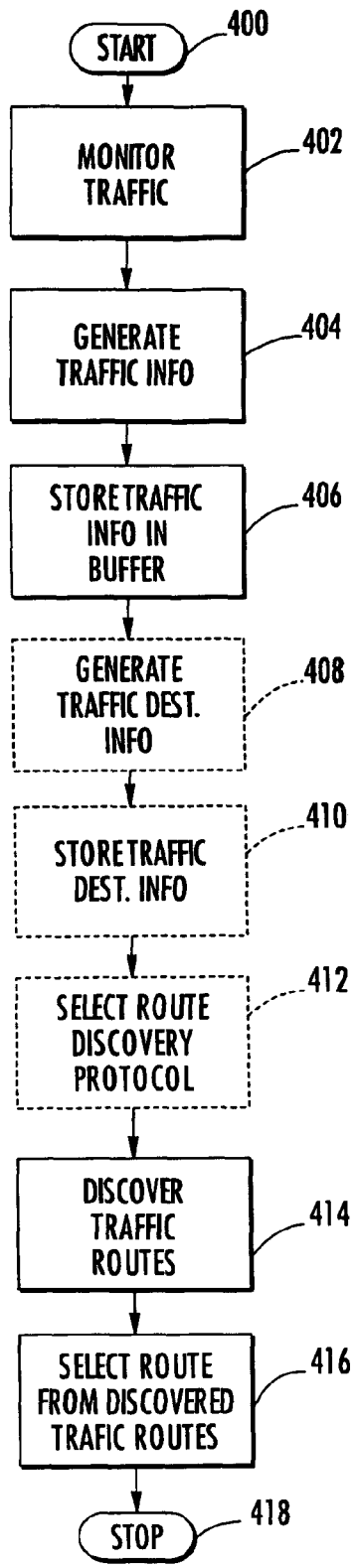
FIG. 14 is a flowchart illustrating the method steps for tracking traffic in a mobile ad hoc network in accordance with the present invention.

Another embodiment of the present invention provides traffic tracking for multihop routes in a mobile ad hoc network, and will be described with reference to FIGS. 13 and 14. As shown in FIG. 13, the network 24 again includes a plurality of wireless mobile nodes 30 and a plurality of wireless communication links 32 connecting the plurality of nodes together. The method begins at block 400 (FIG. 14) and includes each node monitoring traffic communicated between nodes 30 in the network 24 (block 402). Each node 30 generates traffic information based upon how much traffic is being communicated between various nodes in the network 24 (block 404), and each node stores the traffic information locally in a buffer as a traffic database (block 406).

In the method, the traffic information is preferably based upon bandwidth and may include error rate, end-to-end delay, end-to-end delay variation, hop count, expected path durability, and/or priority. The traffic database may comprise a 1-hop traffic matrix. In other words, the database for a specific node 1 would include traffic information for each link 32 between nodes 2-8 in the network. In FIG. 13, node 1 needs a traffic route A to node 6. Here, if nodes 7 and 8 are sending large amounts of traffic, but nodes 1-6 are not, it would be better to route traffic through 1-2-3-4-5-6 rather than 1-7-8-6 even though it would result in more hops.

The method may be advantageous to routing protocol selection, protocol parameter optimization, and route selection. A traffic matrix is shown in the example below. For a 7 node network, each element in the matrix denotes how much traffic, if any, is being sent from the source node on that row to the destination node on that column. Here, the traffic is quantified in terms bandwidth over some interval (recent bandwidth used may be weighted more), and may include packet loss rate, delay, etc. If the traffic matrix is sparsely populated (lots of zero or near zero bandwidth entries), a reactive routing protocol would be more advantageous, since routes are not constantly updated that will not be used anyway. Conversely, a dense traffic matrix would indicate lots of interaction between nodes 30 and a proactive or hybrid protocol may provide benefits. Accordingly, the method may include each node selecting a route discovery protocol, such as a reactive, proactive or hybrid protocol, based upon the stored traffic information and (block 412).

| TRAFFIC DATABASE | | | | | | | |
|---|---|---|---|---|---|---|---|
| | Destination | | | | | | |
| Source | 1 | 2 | 3 | 4 | 5 | 6 | 7 |
| 1 | N/A | 1 Mbps | 0 | 0 | 0 | 1 Mbps | 300 kbps |
| 2 | 0 | N/A | | 10 kbps | 0 | 0 | 0 |
| 3 | 0 | 0 | N/A | 0 | 0 | 10 kbps | 0 |
| 4 | 10 kbps | 0 | 0 | N/A | 0 | 1 Mbps | 0 |
| 5 | 0 | 300 kbps | | 10 kbps | N/A | 0 | 0 |
| 6 | 0 | 0 | 1 Mbps | 0 | 0 | N/A | 10 kbps |
| 7 | 300 kbps | 0 | 300 kbps | 0 | 0 | 0 | N/A |

Nodes know what traffic they are sending, receiving and forwarding. To know traffic they are not directly involved with, they can monitor or be explicitly sent messages containing traffic data. Routing protocols such as DSR that collect route information promiscuously (by hearing other nodes' requests RREQ and replies RREP, or by observing the source route in data packets) could be adapted to build much of the traffic matrix. Link-state routing protocols, such as optimized link state routing (OLSR), already share route information, and could be extended to share traffic matrix information, since each node knows what it sends to whom, and at what quality. Also, a protocol could set timers according to expected delays through a sequence of hops, based upon the traffic matrix bandwidths, since it will know what delays to expect due to traffic congestion. This may reduce or eliminate unnecessary timeouts from occurring.

Furthermore, at block 408, each node 30 may generate traffic destination information based upon how many destinations each of various nodes communicates with in the network 24, and store (block 410) the traffic destination information in a destination quantity database. Thus, each node 30 may also discover and select traffic routes based upon the stored traffic destination information. In other words, the destination quantity database would reveal the number of destinations that each of the particular nodes is communicating with.

Referring again to FIG. 7, the controller 44 of a router 40 in a network 24 in accordance with this embodiment, includes a traffic monitoring unit 70 to monitor traffic communicated between nodes 30 in the network. A traffic information generator 76 generates traffic information based upon how much traffic is being communicated between various nodes in the network, and a traffic information buffer 78 stores the traffic information in a traffic database.

The traffic monitoring unit 70 may broadcast a traffic activity query, and processes replies to the traffic activity query. Alternatively, the traffic monitoring unit 70 may passively monitor the traffic between nodes 30 in the network 24. The route discovery unit 50 discovers routing to a destination node based upon the stored traffic information, and the route selection unit 58 selects traffic routes to the destination node based upon the stored traffic information. Also, the route discovery unit 50 may process the traffic information stored in the traffic database to select one of a reactive, proactive and hybrid route discovery process, and discovers traffic routes with the selected route discovery process. Each traffic route comprises a combination of wireless communication links 32.

A traffic destination information generator 72 generates traffic destination information based upon how many destinations each of various nodes 30 communicates with in the network 24, and a destination information buffer 74 stores the traffic destination information in a destination quantity database. The route discovery unit 50 may also discover routing to a destination node based upon the stored traffic destination information, and the route selection unit 58 may select traffic routes to the destination node based upon the stored traffic destination information.

Another embodiment of the present invention provides dynamic channel allocation in the mobile ad hoc network to efficiently make use of a plurality of channels. A method for dynamic channel allocation will be described while referring to FIGS. 15-18. Here, the network 26 includes a plurality of wireless mobile nodes 30 and a plurality of wireless communication links 32 connecting the plurality of nodes together over a plurality of channels. IEEE 802.11 spinoffs like 802.11a will make use of the ISM spectrum in the 5 GHz band. In this band, there is more bandwidth available to support many channels. As a result, a process to automatically assign a channel to an 802.11 node would be important. Such a channel decision would be based on current channel utilization and sampling of the other channels. Using dynamic channel selection would provide better performance since the spectrum would be used evenly. Additionally, channel use could be throttled such that QoS is maintained for current stations using the channel.

The method begins at block 500 (FIG. 18) and includes each node 30 monitoring link performance on a first channel. Link performance is based upon a quality of service (QoS) threshold, such as bandwidth, error rate, end-to-end delay, end-to-end delay variation, hop count, expected path durability, and priority, for example. At block 504) each node scouts one or more other available channels when the monitored link performance on the first channel falls below the QoS threshold, for example, minimum bandwidth or maximum delay. Scouting may include periodically monitoring other channels for link performance.

Scouting may comprise switching to a second channel (block 512), broadcasting a channel activity query to determine the link performance for the second channel (block 516), and processing replies to the channel activity query to determine the link performance for the second channel at block 518. Furthermore, each node 30 may switch back to the first channel and broadcast a channel change message if the link performance on the second channel is above the QoS threshold (block 506), or switch to subsequent channels and broadcast channel activity queries to determine the link performance for the those channels if the link performance on the previous channel is below the QoS threshold (block 504).

Alternatively, scouting may comprise switching to another channel (block 512), and passively monitoring the link performance for the second channel at block 514. Again, each node 30 may switch back to the first channel and broadcast a channel change message if the link performance on the second channel is above the QoS threshold (block 506), or switch to subsequent channels and passively monitor the link performance for those channels if the link performance on the previous channel is below the QoS threshold (block 504). Also, each node 30 may store link performance information of each of the plurality of channels (block 508) and/or store channel information for neighboring nodes at block 510. In other words, each node 30 may keep track of what channel other nodes are using.

Figure 15:
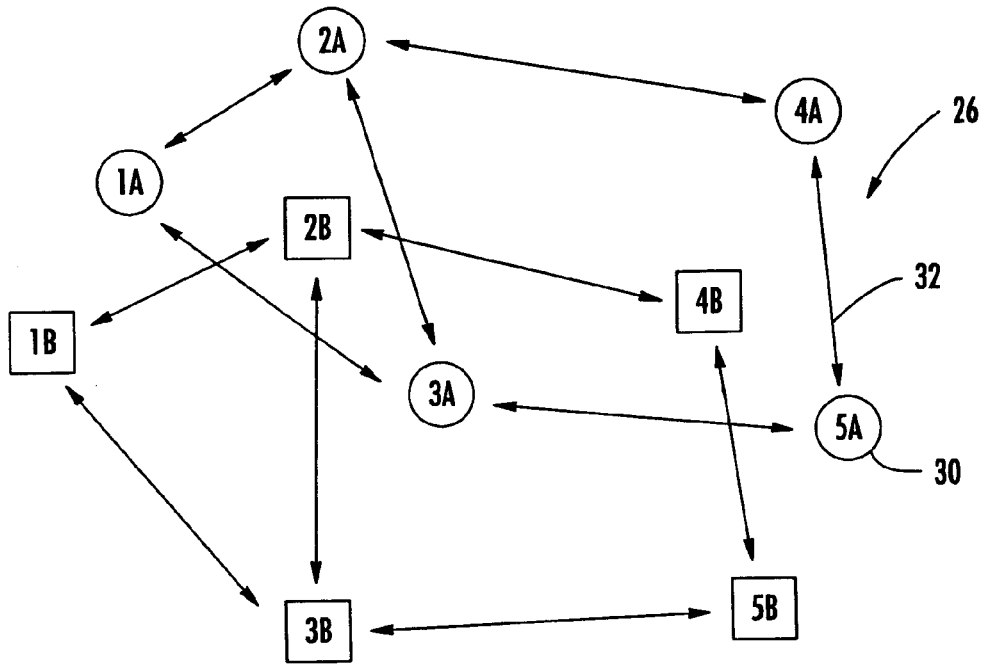
FIGS. 15-17 are schematic diagrams of a mobile ad hoc network including dynamic channel allocation in accordance with the present invention.
Figure 16:
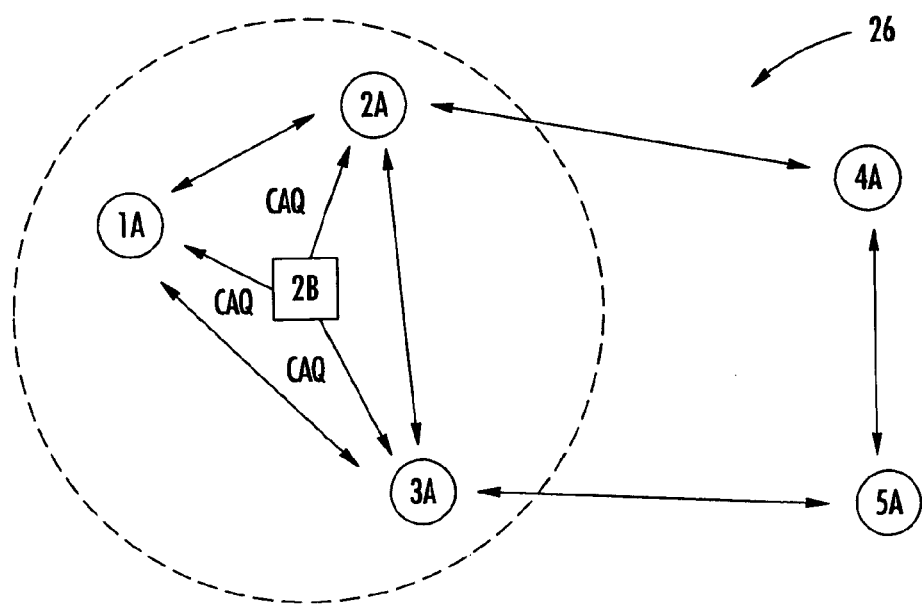
Figure 17:
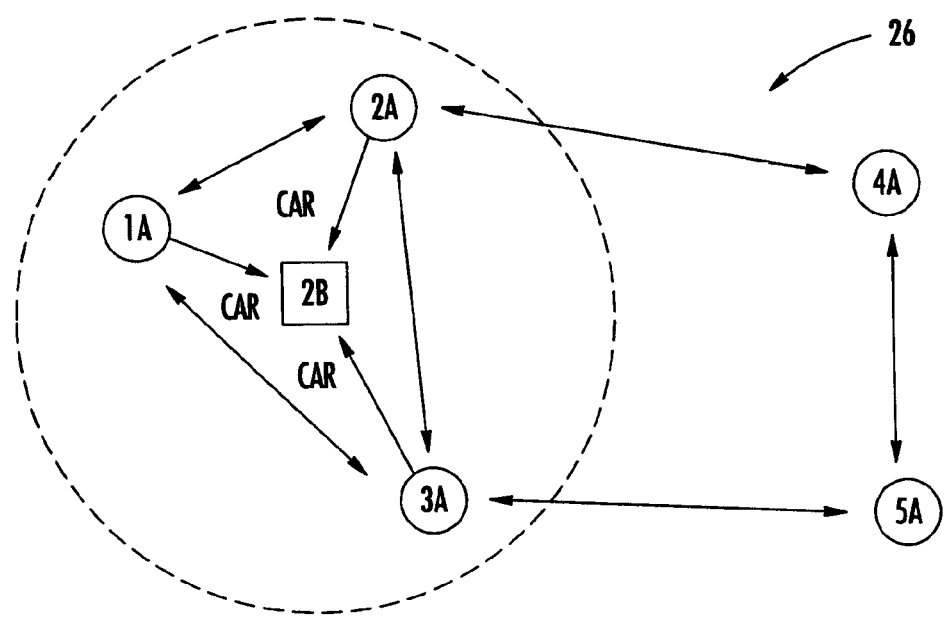
Figure 18:
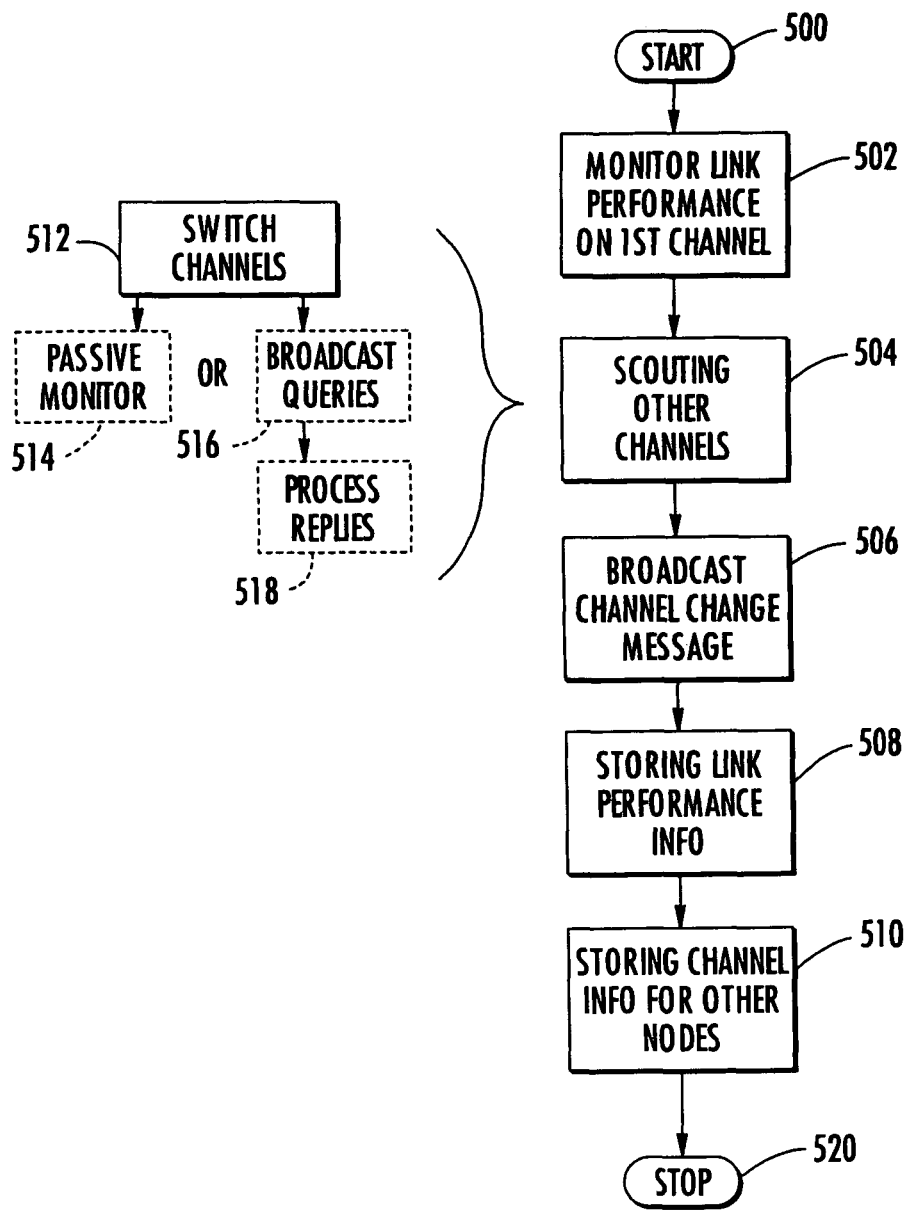
FIG. 18 is a flowchart illustrating the method steps for dynamic channel allocation in a mobile ad hoc network in accordance with the present invention.

For example, as shown in FIGS. 15-17, the network 26 includes nodes 30 and links 32. Nodes 1A-5A are currently using a first channel, while nodes 1B-5B are currently using a second channel. Node 2B determines that the link performance for the second channel is falling or has fallen below a QoS threshold, such as below a minimum bandwidth. Node 2B switches to the first channel and broadcasts a channel activity query CAQ to nodes within 1-hop of node 2B (FIG. 16). Nodes 1A, 2A and 3A send channel activity replies CAR to node 2B with information on the link performance of the first channel (FIG. 17). If the bandwidth on the first channel is acceptable to node 2B, it will return to the second channel and broadcast a channel change message to inform any nodes 1B, 3B, 4B and 5B that it is changing to the first channel. These nodes would then note where node 2B can be found for future reference. If the bandwidth is not acceptable, node 2B will move to a third channel and repeat the steps. If all channels have been visited and node 2B has not found bandwidth above the QoS threshold, then it will select the best one, and may periodically search for a better channel.

A system aspect of this embodiment of the present invention is directed to the mobile ad hoc network 26 having a plurality of mobile nodes 30, and a plurality of wireless communication links 32 connecting the plurality of mobile nodes together over a plurality of channels. Referring to FIGS. 6 and 7, each mobile node comprises a router 40 having a communications device 42 to wirelessly and unidirectionally or bi-directionally communicate with other nodes via the wireless communication links 32, and a controller 40 to route communications via the communications device. The controller 40 includes a link performance monitor 80 to monitor link performance on a first channel. A channel scouting unit 82 scouts one or more other available channels when the monitored link performance on the first channel falls below the QoS threshold.

The channel scouting unit 82 switches to a second channel, broadcasts a channel activity query to determine the link performance for the second channel, and processes replies to the channel activity query to determine the link performance for the second channel. Also, the channel scouting unit 82 switches back to the first channel and broadcasts a channel change message if the link performance on the second channel is above the QoS threshold, or switches to subsequent channels and broadcasts channel activity queries to determine the link performance for those channels if the link performance on the previous channel is below the QoS threshold. Alternatively, the channel scouting unit 82 may switch to another channel and passively monitor the link performance for the second channel. A link performance information memory 66 stores the link performance information of each of the plurality of channels, and a channel information memory 68 stores channel information for neighboring nodes.

The disclosures of related applications entitled "ADMISSION CONTROL IN A MOBILE AD HOC NETWORK", U.S. Pat. No. 7,007,102, issued Feb. 28, 2006; "TRAFFIC POLICING IN A MOBILE AD HOC NETWORK", U.S. Pat. No. 7,068,600, issued Jun. 27, 2006; "DETERMINING QUALITY OF SERVICE (QoS) ROUTING FOR MOBILE AD HOC NETWORKS", U.S. Pat. No. 6,954,435, issued Oct. 11, 2005; and "ALLOCATING CHANNELS IN A MOBILE AD HOC NETWORK", U.S. Pat. No. 7,616,961, issued Nov. 10, 2009, to the same assignee and are incorporated by reference herein in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodi- That which is claimed is:

1. A method for tracking traffic in a mobile ad hoc network comprising a plurality of wireless mobile nodes and a plurality of wireless communication links connecting the plurality of nodes together, the method comprising:
   at each node, monitoring traffic communicated between nodes throughout the network on a first channel;
   at each node, generating monitored-traffic information based upon how much monitored-traffic is being communicated between various nodes throughout the network and including calculating quality-of-service (QoS) tag values based upon at least one node specific QoS metric and a QoS parameter of traffic information;
   at each node, determining whether a node can support a requested QoS parameter and admit traffic;
   at each node, scouting one or more other available separate channels at different frequencies when the QoS tag values on the first channel fall below a QoS threshold and switching to a second separate channel at a different frequency if QoS tag values on the second separate channel are above the QoS threshold;
   at each node, storing the monitored-traffic information in a traffic database;
   at each node, processing the monitored-traffic information stored in the traffic database to select one of a reactive, proactive and hybrid route discovery process; and
   at each node, discovering traffic routes with the selected route discovery process, each traffic route comprising a combination of wireless communication links.

2. A method according to claim 1 wherein the monitored-traffic information is based upon bandwidth.

3. A method according to claim 1 wherein the traffic database comprises a 1-hop traffic matrix.

4. A method according to claim 1 wherein monitoring comprises:
   broadcasting a traffic activity query; and
   processing replies to the traffic activity query.

5. A method according to claim 1 wherein monitoring comprises passively monitoring the traffic between nodes throughout the network.

6. A method according to claim 1 further comprising:
   at each node, generating traffic destination information based upon how many destinations each of various nodes communicates with throughout the network; and
   at each node, storing the traffic destination information in a destination quantity database.

7. A method for determining routes in a mobile ad hoc network comprising a plurality of wireless mobile nodes and a plurality of wireless communication links connecting the nodes together, the method comprising:
   at each node, monitoring traffic communicated between nodes throughout the network on a first channel;
   at each node, generating monitored-traffic information based upon how much monitored-traffic is being communicated between various nodes throughout the network and including calculating quality-of-service (QoS) tag values based upon at least one node specific QoS metric and a QoS parameter of traffic information;
   at each node, determining whether a node can support a requested QoS parameter and admit traffic;
   at each node, storing the monitored-traffic information in a traffic database;
   at each node, processing the monitored-traffic information stored in the traffic database to select one of a reactive, proactive and hybrid route discovery process;
   at each node, discovering traffic routes with the selected route discovery process, each traffic route comprising a combination of wireless communication links;
   at each node, selecting discovered routes for communication with other nodes; and
   at each node, scouting one or more other available separate channels at different frequencies when the QoS tag values on the first channel fall below a QoS threshold and switching to a second separate channel at a different frequency if QoS tag values on the second separate channel are above the QoS threshold.

8. A method according to claim 7 wherein the monitored-traffic information is based upon bandwidth.

9. A method according to claim 7 wherein the traffic database comprises a 1-hop traffic matrix.

10. A method according to claim 7 wherein monitoring comprises:
    broadcasting a traffic activity query; and
    processing replies to the traffic activity query.

11. A method according to claim 7 wherein monitoring comprises passively monitoring the traffic between nodes throughout the network.

12. A method according to claim 7 wherein selecting traffic routes comprises each node selecting traffic routes based upon the stored monitored-traffic information.

13. A method according to claim 7 further comprising:
    at each node, generating traffic destination information based upon how many destinations each of various nodes communicates with throughout the network; and
    at each node, storing the traffic destination information in a destination quantity database.

14. A method according to claim 13 wherein processing the monitored-traffic information further comprises selecting the route discovery process based upon the traffic destination information stored in the destination quantity database.

15. A method according to claim 13 wherein selecting discovered routes comprises each node selecting discovered routes based upon the stored traffic destination information.

16. A mobile ad hoc network comprising:
    a plurality of mobile nodes; and
    a plurality of wireless communication links connecting the plurality of mobile nodes together;
    each mobile node comprising a communications device configured to wirelessly communicate with other nodes of the plurality of nodes via the wireless communication links, and a controller configured to route communications via the communications device, and comprising
      a traffic monitoring unit configured to monitor traffic communicated between nodes throughout the network on a first channel,
      a traffic information generator configured to generate monitored-traffic information based upon how much monitored-traffic is being communicated between various nodes throughout the network and including calculating quality-of-service (QoS) tag values based upon at least one node specific QoS metric and a QoS parameter of traffic information, and to determine whether a respective node can support a requested QoS parameter and admit traffic,
    at each node, scout one or more other available separate channels at different frequencies when the QoS tag values on the first channel fall below a QoS threshold and switch to a second separate channel at a different frequency if QoS tag values on the second separate channel are above the QoS threshold, a monitored-traffic information buffer configured to store the monitored-traffic information in a traffic database, and a route discovery unit configured to process the monitored-traffic information stored in the traffic database to select one of a reactive, proactive and hybrid route discovery process, discover traffic routes with the selected route discovery process, each traffic route comprising a combination of wireless communication links.

17. A network according to claim 16 wherein the monitored-traffic information is based upon bandwidth.

18. A network according to claim 16 wherein the traffic database comprises a 1-hop traffic matrix.

19. A network according to claim 16 wherein the traffic monitoring unit is configured to broadcast a traffic activity query, and processes replies to the traffic activity query.

20. A network according to claim 16 wherein the traffic monitoring unit is configured to passively monitor the traffic between nodes throughout the network.

21. A network according to claim 16 further comprising:

a traffic destination information generator configured to generate traffic destination information based upon how many destinations each of various nodes communicates with the network; and a destination information buffer configured to store the traffic destination information in a destination quantity database.

* * * * *